Dec. 1, 1970 R. C. BYRNE ET AL 3,544,857

INTEGRATED CIRCUIT ASSEMBLY WITH LEAD STRUCTURE AND METHOD

Original Filed Feb. 27, 1967 5 Sheets-Sheet 1

INVENTORS
Robert C. Byrne
Alan V. King
Albert P. Youmans
BY
Flehr & Swain
Attorneys

INTEGRATED CIRCUIT ASSEMBLY WITH LEAD STRUCTURE AND METHOD

Original Filed Feb. 27, 1967 5 Sheets-Sheet 2

INVENTORS
Robert C. Byrne
Alan V. King
Albert P. Youmans
BY Flehr & Swain
Attorneys

INTEGRATED CIRCUIT ASSEMBLY WITH LEAD STRUCTURE AND METHOD

Original Filed Feb. 27, 1967

INVENTORS
Robert C. Byrne
Alan V. King
BY Albert P. Youmans
Attorneys

INVENTORS
Robert C. Byrne
Alan V. King
BY Albert P. Youmans
Flehr & Swain
Attorneys

INTEGRATED CIRCUIT ASSEMBLY WITH LEAD STRUCTURE AND METHOD

INVENTORS
Robert C. Byrne
Alan V. Young
BY Albert P. Youmans
Flehr, Hohbach, Test, Albritton & Herbert
Attorneys 3,544,857
INTEGRATED CIRCUIT ASSEMBLY WITH LEAD STRUCTURE AND METHOD

Robert C. Byrne, Sunnyvale, Alan V. King, Saratoga, and Albert P. Youmans, Cupertino, Calif., assignors to Signetics Corporation, Sunnyvale, Calif., a corporation of California

Continuation of application Ser. No. 618,973, Feb. 27, 1967, which is a continuation-in-part of application Ser. No. 572,720, Aug. 16, 1966. This application May 26, 1969, Ser. No. 828,013
**Int. Cl. H01l *1/14;* H05k *5/06***
U.S. Cl. 317—234 5 Claims

ABSTRACT OF THE DISCLOSURE

An integrated circuit assembly with a lead structure which includes thin film connecting elements for making connections between the leads and the contact pads carried by a semiconductor body. The thin film conncting elements may be carried by an insulating member such as a plastic film.

CROSS-REFERENCES TO RELATED APPLICATIONS

This application is a continuation of an application Ser. No. 618,973, filed Feb. 27, 1967, now abandoned, which is a continuation-in-part of application Ser. No. 572,720, filed Aug. 16, 1966, now abandoned.

BACKGROUND OF THE INVENTION

This invention relates to integrated circuit assemblies and the manner in which the integrated circuits are packaged and the leads are connected to the integrated circuit die.

In the packaging of integrated circuits, it has been conventional to utilize flying bonded leads. The use of such leads often has been found to be objectionable because such leads are expensive and require considerable time and effort for making the bonds required by such leads. In addition, it has been found that the utilization of leads of this type do not lend themselves to multiple chip assemblies in which each of the chips carries an integrated circuit. There is, therefore, a need for a new and improved lead structure for integrated circuits and an assembly thereof and particularly assemblies thereof which incorporate multiple chips or, in other words, a multiplicity of integrated circuits.

In general, it is an object of the present invention to provide an integrated circuit assembly and method which overcomes the above named disadvantages.

Another object of the invention is to provide an assembly and method of the above character in which the lead pattern is formed on a plastic material which can be left in place or be removed as desired.

Another object of the invention is to provide a lead structure and assembly of the above character in which it is possible to electrically test the integrated circuit before final assembly.

Another object of the invention is to provide an assembly of the above character in which it is possible to measure the parameters $V_{BE(sat)}$, $V_{CE(sat)}$, $I_{CBo}$ and $I_{EBo}$ before the assembly is completed.

Another object of the invention is to provide an assembly of the above character which is particularly adapted for molding in a plastic package.

Another object of the invention is to provide an assembly of the above character which is particularly adapted for use with printed circuit boards.

Another object of the invention is to provide an assembly of the above character in which the printed circuit boards can be of the type having layers on one or two sides or with multiple layers.

Additional objects and features of the invention will appear from the following description in which the preferred embodiments are set forth in detail in conjunction with the accompanying drawings.

SUMMARY OF THE INVENTION

The integrated circuit assembly with lead structure consists of a semiconductor body having at least portions of an electrical circuit formed therein and with contact pads carried by the body and lying in a common plane with leads carried by the body connecting the circuit to the pads. Support means is provided, at least a portion of which is formed of insulating material. A plurality of spaced metallic leads are carried by the support means and are insulated from each other by the support means. The leads have contact areas arranged in a pattern lying in a common plane. A plurality of connecting elements of thin metallic film are in direct and intimate contact with the contact areas and are also in direct and intimate contact with the contact pads whereby the thin film connecting elements form the sole means for making electrical contact between the leads and the contact pads so that electrical contact may be made to the portions of the electrical circuit through the leads. In certain embodiments of the invention, the connecting elements are carried by a flexible plastic tab or member.

In the method, the thin film connecting elements are deposited upon the plastic member or tab with inner portions of the elements being arranged in a pattern which corresponds to the pattern of the pads of the semiconductor body and the outer extremities correspond to the contact areas of the leads. After the bonds have been made between the leads, the contact elements and the pads of the semiconductor body, the plastic can be removed.

DESCRIPTION OF THE PREFERRED EMBODIMENTS

Figure 1:
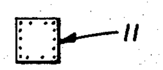
FIG. 1 is a greatly enlarged top plan view of a chip or die which has an integrated circuit formed thereon and which has bumps or pillars provided on the pads.
Figure 2:
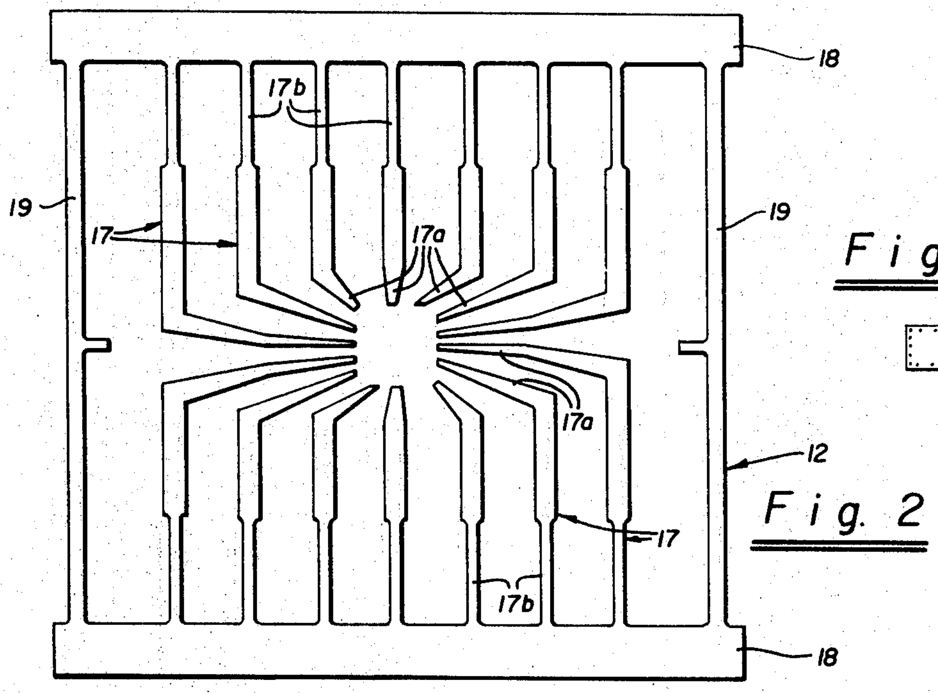
FIG. 2 is a greatly enlarged plan view of a lead frame used in the lead structure.
Figure 3:
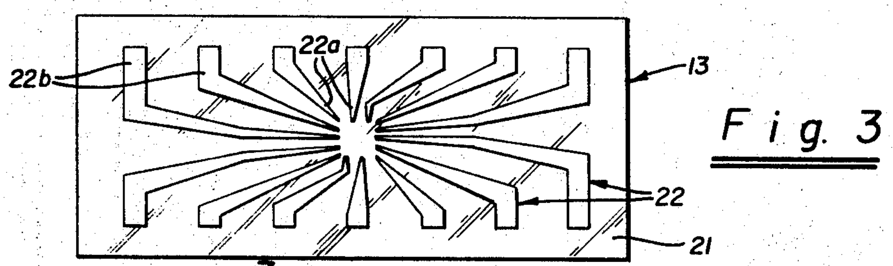
FIG. 3 is a greatly enlarged plan view of a tab and a lead pattern formed thereon also used in the lead structure.

As shown in the drawings, the integrated circuit assembly consists of at least one integrated circuit chip or die 11 shown in FIG. 1, a lead frame structure 12 shown in FIG. 2, and a tab or insulating member 13 as shown in FIG. 3.

The integrated circuit chip or die 11 can be of a conventional type utilizing planar technology in which the chip is formed of a suitable semiconductor material such as silicon. The integrated circuit or device is formed by diffusing impurities into the silicon to form regions of opposite conductivity with junctions between the same extending to the planar upper surface of the silicon die. Leads 14 (see FIG. 5) which make contact with the active regions of the devices of the integrated circuit are evaporated onto the die by conventional methods. The leads normally extend to a region adjacent to the outer perimeter of the die and are provided with pads **14*a* or larger areas in a predetermined pattern adjacent the outer perimeter of the die. The pads 14*a*** lie in a common plane and serve as interconnect areas. As is well known to those skilled in the art, the integrated circuit can contain active and passive devices such as transistors, diodes, resistors and other electronic components to form at least part of an electrical circuit. The transistors can be of the n-p-n or p-n-p type.

In order to facilitate mounting of the integrated circuit die as hereinafter described, it is desirable to form raised portions or pillars 16 onto the interconnect areas or pads **14*a* on the die 11. These pillars 16 can be formed in a conventional manner such as by evaporating a relatively thick layer of copper onto a thin layer of aluminum already on the die and then selectively etching away the copper so that copper bumps or pillars remain over the interconnect areas or pads 14*a*** of the die. The pillars can be of any suitable height as, for example, 1 mil.

The foregoing steps in making the integrated circuit devices can all be formed on a wafer from which the individual dies are formed. After the pillars are formed, the wafer can be scribed to form the individual dies each of which carries an integrated circuit.

The lead frame 12 is formed of a suitable conducting metallic material such as Kovar. The lead frame 12 is formed in a predetermined pattern as, for example, by means of punching the lead frames from sheets of the Kovar to provide a plurality of leads 17 which are provided with narrower portions **17*a* which extend inwardly into a predetermined configuration as, for example, rectangular as shown in FIG. 2 of the drawings to form an opening 20. As will be noted from FIG. 2, the inner portions 17*a* are spaced relatively close together. The leads 17 are also provided with outer narrower portions 17*b* which are also arranged in a predetermined configuration, and, as shown in FIG. 2, extend outwardly in opposite directions, are spaced apart and are substantially parallel to each other. However, the spacing between the portions 17*b* is substantially greater than the spacing between the portions 17*a*. The lead frame 12 also includes interconnecting sections or portions 18 which interconnect the outer extremities of the leads 17**.

The tab or insulating member 13 is formed of a sheet 21 of a suitable insulating material. In certain application, it has been found that it is desirable that the sheet of insulating material be formed of a suitable plastic such as Kapton polyamide film manufactured and sold by Du Pont. This film is particularly desirable because it is relatively stable dimensionwise under changes in temperature and is capable of withstanding relatively high temperatures from 250° to 500° C. to permit the use of various attaching techniques as hereinafter described.

Figure 6:
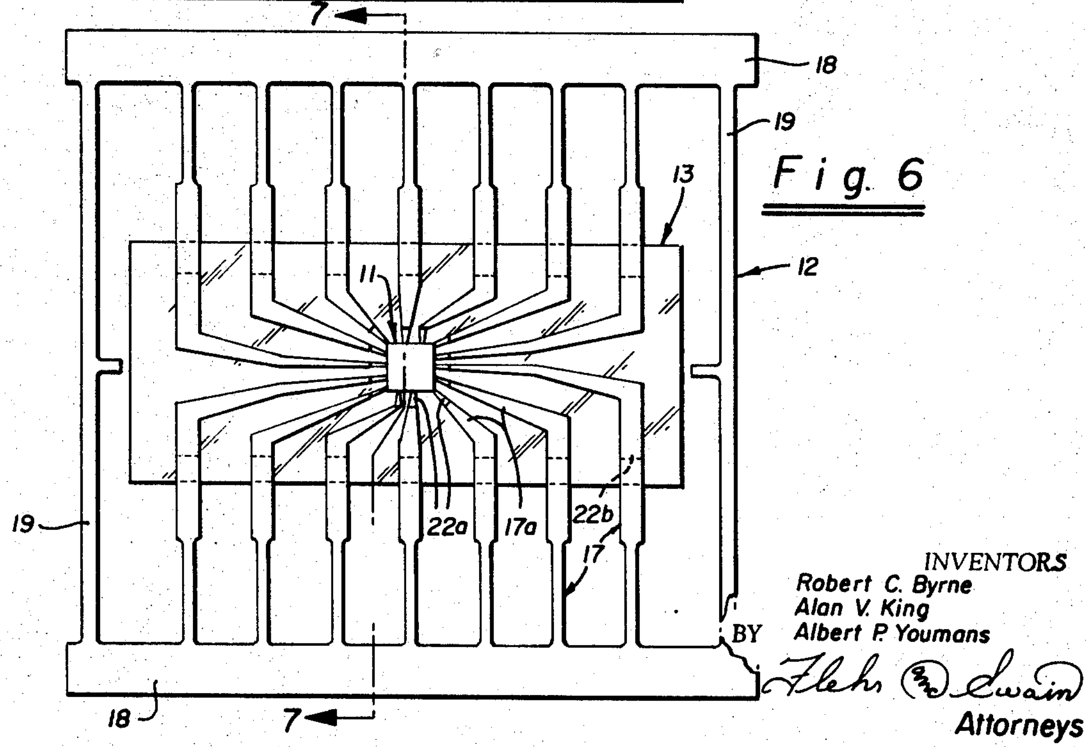
FIG. 6 is an enlarged top plan view of an assembly incorporating the integrated circuit chip of FIG. 1, the lead frame of FIG. 2 and the tab of FIG. 3 into a unitary assembly.

As shown in FIG. 3, the sheet 21 is substantially rectangular and has a length which is approximately the same as the length of the metal frame 12. It, however, has a width which is substantially less than the width of the metal frame so that the leads 17 will extend over the ends of the sheet 21 as shown particularly in FIG. 6. It, however, should be pointed out that the sheet 21 which forms a part of the tab 13 can be appreciably smaller if desired. It is only necessary that it be slightly larger than the die 11 to permit the interconnections hereinafter described to be made. The film comprising the sheet 21 can be of any suitable thickness as, for example, one-half a mil. Metallized leads or connecting elements 22 are formed on the sheet 21 in any suitable manner. For example, the leads 22 can be deposited upon the sheet 21 by evaporating a thin layer of the desired metal upon the sheet and then selectively etching away the undesired portions by the use of conventional photoetching techniques. Alternatively, the film can be formed on a thin copper foil and then the copper foil can be selectively etched away to provide the leads 22 on the tab 13. The thin film connecting elements normally have a width ranging from 2 to 5 mils, and a thickness ranging from ½ mil to 5 mils.

The leads 22 also have narrower portions **22*a* which extend inwardly and form a predetermined pattern, the inner ends of which correspond to the pattern formed by the pillars 16 on the die 11. The leads 22 are also provided with outer portions 22*b* which are spaced apart and extend parallel to each other but which terminate short of the outer edge of the sheet 21 so that all portions of the leads 22 are supported by and are carried by the sheet 21. It will be noted that the pattern of the leads 22 and the pattern forming the leads 17** are very similar for purposes hereinafter described.

Figures 4, 5:
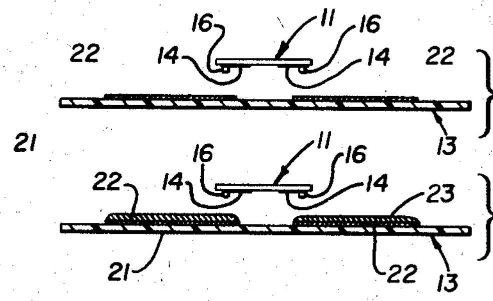
FIG. 4 is an enlarged cross-sectional view taken along the line 4—4 of FIG. 3.
FIG. 5 is an enlarged view similar to FIG. 4 showing an integrated circuit die mounted on the tab.

After the tab 13 has been completed, the leads 22 can be tinned with solder 23 as shown in FIG. 5. The die 11 is then turned upside down so that the pillars 16 contact the leads 22 on the tab 13. The entire assembly of the tab 13 and the die 11 is heated causing solder bonds to be formed between the pillars 16 and the leads 22.

Figure 7:
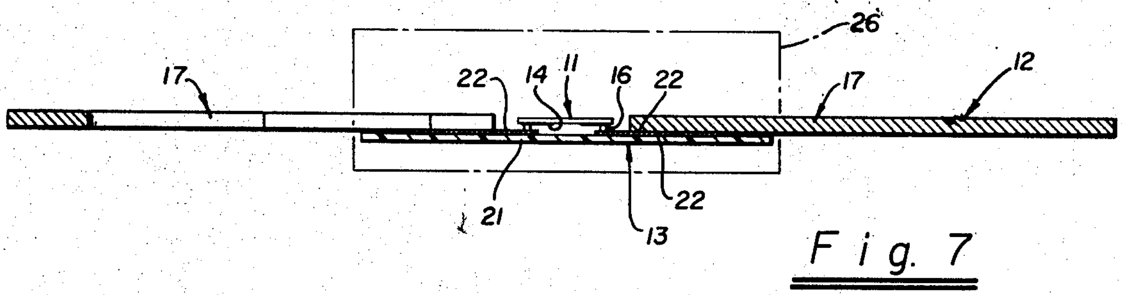
FIG. 7 is an enlarged cross-sectional view of the integrated circuit assembly.

After the die 11 has been bonded to the interconnecting leads 22 carried by the tab 13, lead means in the form of the lead frame 12 is placed over the die 11 so that the opening 20 provided in the lead frame 12 is in general registration with the die 11 and permits the die 11 to pass therethrough as shown in FIG. 7 with the leads 17 coming into engagement with and being in registration with the leads 22 carried by the tab 13. This assembly is then heated so that the solder forms bonds between the leads 17 and the leads 22 to form a relatively rigid unitary assembly. As can be seen particularly from FIG. 6, the inner portions **17*a* of the leads 17 are in registration with the end portions 22*a* of the leads 22 but stop short of the die 11. The other portions of the leads 22 overlying the leads 17 are in registration with the leads 17**.

Figure 8:
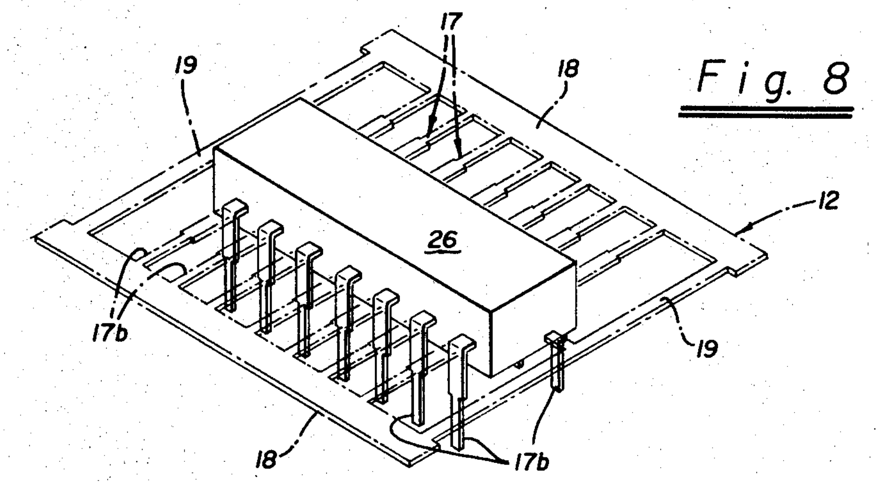
FIG. 8 is an isometric view of the assembly shown in FIG. 5 molded into a plastic package and also showing the manner in which the lead frame is bent and cut off to provide a plurality of downwardly depending leads.

The assembly has been formed as shown in FIG. 7. The outer ends of the sheet 21 can be cut away and then the die 11 with the interconnecting lead structure carried by the sheet 17 and the leads 22 of the lead frame can be completely encapsulated in a solid plastic body 26 which is free of voids and is generally box-shaped as shown in FIG. 8 to serve as support means and to seal the integrated circuit. The portions 18 and 19 of the lead frame 12 are then cut away and the leads 17 are bent so that they depend downwardly substantially at right angles from the plane in which the tab 13 lies within the block or body 26. The outer portion 22*a* of the leads 22 are narrower as previously described so that the completed device which is shown in FIG. 8 can be mounted on printed circuit boards by having the portions 22*a* extend through holes provided in the printed circuit board.

Rather than making the connections between the interconnecting leads 22 and the pillars carried by the integrated circuit die and making the connections between the leads 22 and 17 by solder as hereinbefore described, ultrasonic bonding of the type described in Weissenstern et al. Pat. No. 3,255,511 can be utilized. The ultrasonic energy can be utilized for making the complete bonds, or alternatively, the ultrasonic energy can be utilized for tacking the parts together. Thereafter, flow soldering can be used to form the necessary bonds. Alternatively, tacking can also be utilized and then diffusion can be utilized to achieve a strong bond by the use of a copper indium alloy in which the indium is disposed on the copper pillars or on the interconnecting lead pattern.

Although a glass or ceramic substrate can be utilized for the tab 13 in place of the plastic sheet hereinbefore described, the plastic sheet or film has certain advantages and certain applications. For example, the plastic film can be readily cut in individual patterns. It is not readily damaged by thermal shock such as glass. The plastic is flexible so that the die can be mounted under it and the leads can be flexed downwardly directly into contact with a printed circuit board. It also can be readily encapsulated together with the integrated circuit die or dice into relatively easy to use modules.

Figure 9:
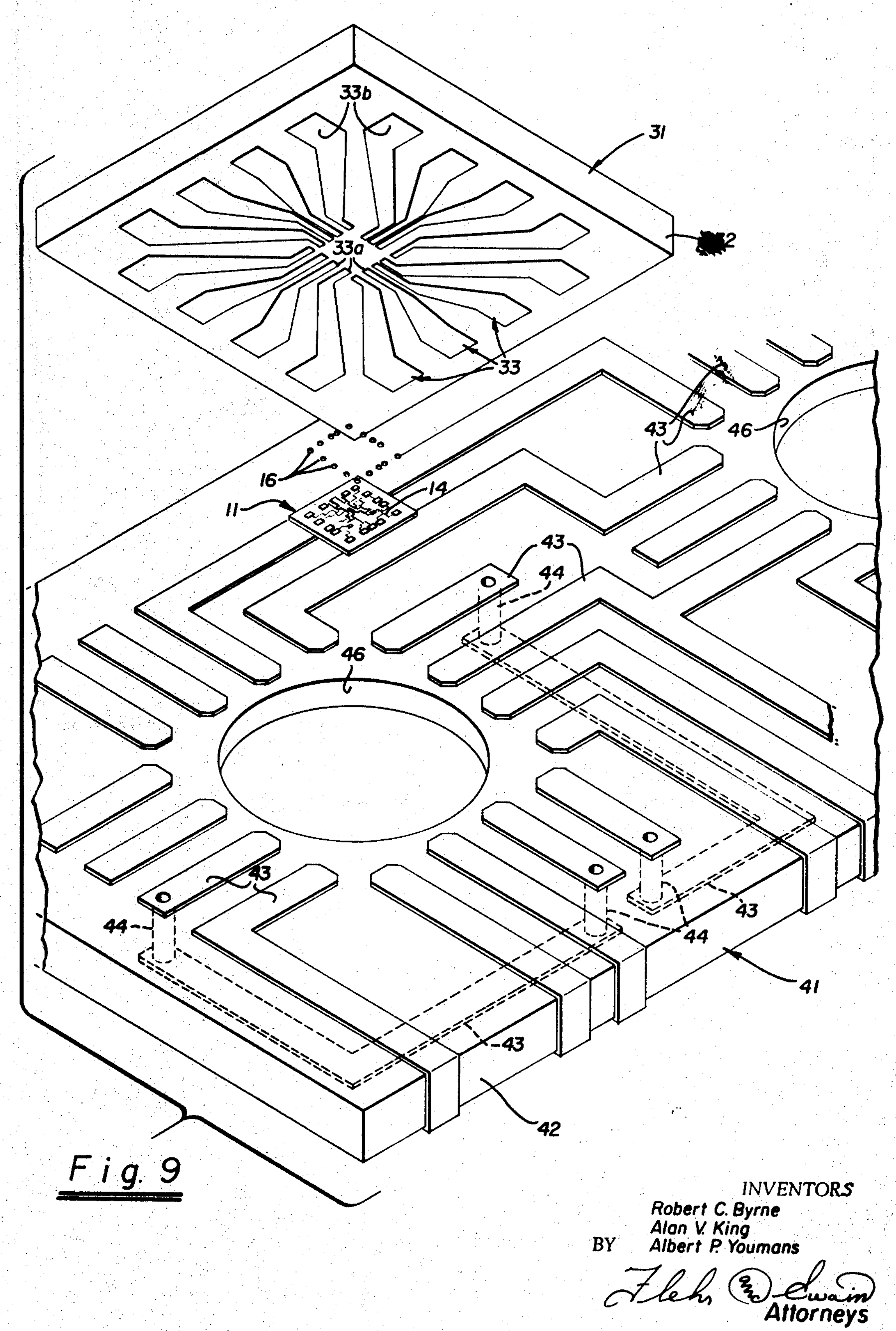
FIG. 9 is an exploded view of a lead structure and assembly incorporating another embodiment of the present invention.
Figure 10:
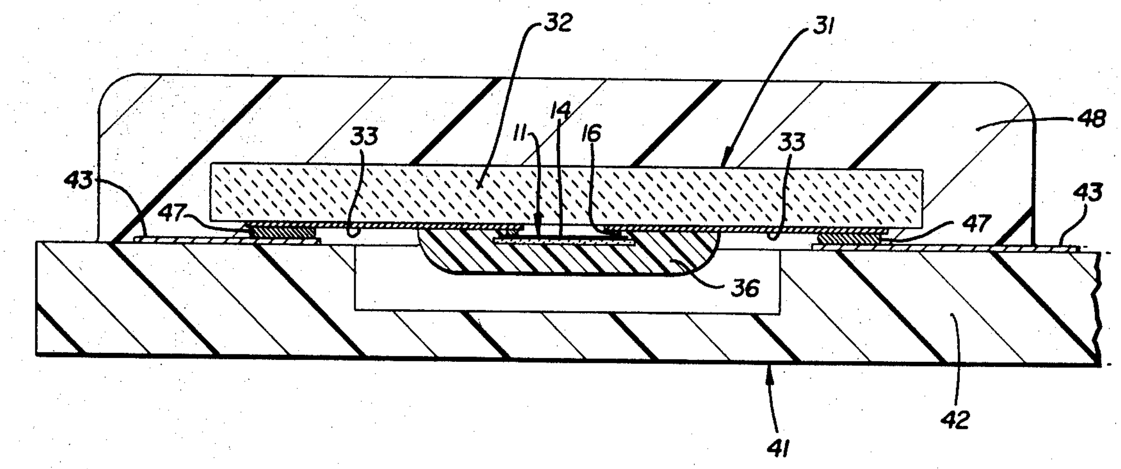
FIG. 10 is a cross-sectional view of an assembly incorporating the present invention.
Figure 11:
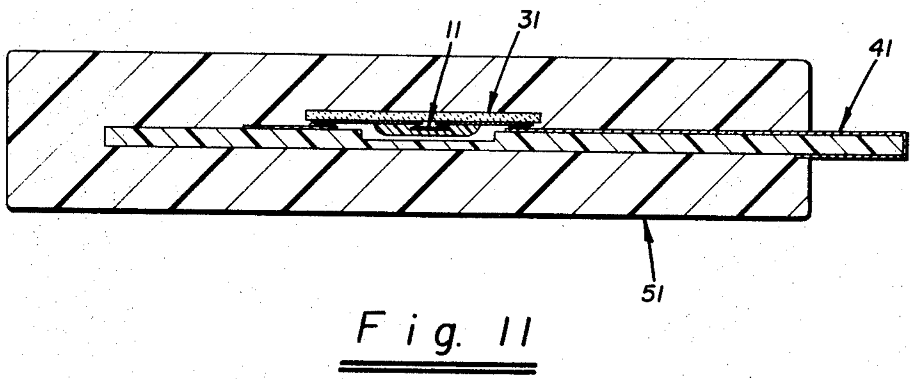
FIG. 11 is a cross-sectional view of still another embodiment of the present invention.

Another embodiment of the invention is shown in FIGS. 9, 10 and 11 in which a rigid tab or insulating member is utilized. The integrated circuit dice 11 are of the type hereinbefore described and are formed on a rigid semiconductor body. A plurality of pillars 16 are formed on the pads or interconnect areas provided on the die 11. A tab 31 is provided and has a rigid rectangular body 32 which is formed of suitable insulating material such as glass or ceramic or plastic as hereinbefore described. A plurality of leads 33 of a conducting metallic material are disposed on one surface of the body or block 32 and lie in a single plane. The leads 33 are arranged in a predetermined pattern and have inner portions 33*a* which terminate at points corresponding to the pillars 16 provided on the die 11. The leads are also provided with outer portions 33*b* to make contact with other leads as hereinafter described. All portions of the leads 33 are supported by the body 32. The die 11 with the pillars 16 is then bonded to the tab 31 by conventional soldering or ultrasonic techniques of the type hereinbefore described so that the interconnect leads 33 form electrical contact with the desired regions of the integrated circuit carried by the die 11.

After this assembly operation has been completed, the die 11 can be encapsulated in a suitable manner such as forming a plastic covering 36 over the die 11 which serves to seal the die 11 to the tab 13.

A printed circuit board 41 of a generally conventional type is utilized. The printed circuit board is provided with a board 42 formed of a suitable insulating material such as a phenolic and which is provided with leads 43 on both sides of the same and which is also provided with plated-through terminals 44 of a conventional type. The printed circuit board 41 differs from conventional boards in that it is provided with recesses 46 for the present application. The recesses 46 can extend only partially through the board as shown in the drawing or, if desired, can be in the form of holes which extend completely through the board.

The inner extremities of the leads 43 terminate in regions close to the edges of the recesses or holes and have patterns which generally correspond to the patterns formed by the outer portions 33*b* of the leads 33 carried by the tabs 31. Thus, in completing the assembly, each tab 31 is inverted and the leads 33 are moved into registration with the leads 43. Thereafter, bonds are formed between the portions 33*b* and the inner extremities of the leads 43 so that electrical contact can be made to the integrated circuits carried by the dice 11 through the leads 43 to form a relatively rigid unitary assembly. The dice 11, together with the encapsulating bodies 36, extend downwardly into the recesses 46 as shown particularly in FIG. 10. The bond between the leads 43 and the leads 33 can also be made in the manner hereinbefore described as, for example, a layer of solder 47 can be provided to form the bond.

A plurality of the tabs 31 can be placed upon each printed circuit board in the manner hereinbefore described. Thereafter, the tabs 31 with each die 11 carried by the tab can be encapsulated on the printed circuit board by forming an additional encapsulating body 48 upon the board as shown particularly in FIG. 10. In this way, the integrated circuits are completely encapsulated with no surrounding atmosphere and are tamperproof.

Another embodiment of the invention is shown in FIG. 11 and is substantially identical to that shown in FIG. 10 with the exception that the entire printed circuit board together with the tabs 31 and the dice 11 are encapsulated in a large body 51 of suitable insulating material such as plastic. In this embodiment, only the outer extremities of the leads 43 are exposed through which contact can be made to the integrated circuit devices carried by the dice.

In the foregoing embodiments, a two-metal system is often utilized for the leads. Aluminum is first evaporated onto the insulating substrate, after which copper is electroplated to the thickness of 1 ml. The desired lead pattern is then etched through the copper and through the aluminum. The aluminum is utilized to obtain good adherance to the substrate, whereas the copper forms a good conductor for the leads. As hereinbefore explained, pillars can be formed either on the interconnect areas on the die or the pillars can be provided on extremities of the interconnect leads.

The printed circuit board can be formed of any suitable material such as an epoxy, ceramic or glass. The printed circuit board has at least one portion of its pattern which will match the pattern of the leads on the tab and also serves to form a complete circuit interconnected with the intergrated circuits which are to be mounted thereon. The printed circuit board may be a multiple layer printed circuit board, or may be a two-sided printed circuit board, or even a one-sided printed circuit board.

It has been found that the construction hereinbefore described has many advantages. For example, when the integrated circuit die has been secured to the tab, the integrated circuit can be electrically tested by probing the large contacts formed by the leads on the tab. This makes it possible to measure such parameters as $V_{BE(sat)}$, $V_{CE(sat)}$, $I_{CBo}$ and $I_{EBn}$ and other electrical tests before incorporating the integrated circuit into additional structure.

The encapsulation of the dies on the boards prevents moisture from contaminating the integrated circuits. Where the board is relatively small, substantially the entire board can be encapsulated as shown in FIG. 11. Where the board is relatively large, expansion and contraction may cause problems; therefore, only the parts where the tabs are located would be potted.

The formation of the tabs by utilizing rigid substrates is advantageous in that large quantities of them can be made at the same time in much the same manner in which the integrated circuit dies are made. Thus, a large number of tabs can be formed from a single strip. This cuts down on handling because the chip is not cut until the patterns on the tabs have been completed.

Still another embodiment of the invention is shown in FIGS. 12–15. In this embodiment of the invention it can be seen how a plurality of the assemblies can be made simultaneously. A plurality of dies 11 are provided, each of which carries at least part or a portion of an electrical circuit. As hereinbefore described, each die 11 is a semiconductor body and contains active and passive devices which are interconnected by leads 14 extending to pads **14*a* provided exclusively adjacent the outer perimeter of the die. The pads 14*a* lie in a substantially common plane. As can be seen from FIG. 12, the plastic sheet or member 21 formed of a suitable plastic such as Kapton has formed thereon a spiderlike pattern of spaced connecting elements 22 formed of a thin metallic film disposed on the sheet 21. As can be seen, the inner portions 22*a* of the connecting elements 22 extend inwardly into an arrangement which has contact areas which are adapted to mate with the contact areas or pads 14*a* provided on the dies. The outer portions 22*b* of the leads 22 are also formed in a pattern which is adapted to mate with the extremities of or the leads 61 formed in a lead frame 62. The inner portions 22*a* have a width which is substantially less than the width of the portions 22*b* and having a spacing which is substantially less than the outer portions 22*b***.

The lead frame 62 is similar to the lead frame 12 and is formed of a suitable material such as Kovar in which leads 61 have been punched out to provide inner portions which have contact areas which are adapted to mate with the outer portion of the leads 22 carried by the member 21. In addition to the leads 61, each separate pattern in the frame is provided with a die attach pad 63 which is supported by leads 64. All the leads are provided with interconnecting portions **62*a* which are cut away after the assembly has been completed as hereinafter described. The spacing between the inner portions of the leads 61 of the lead frame 62 correspond to the spacing between the outer portions 22*b* of the connecting elements 22 on the tab or member 21. If desired, the die attach pad 63 and the supporting leads 64 can be omitted from the lead frame 62**.

As hereinbefore pointed out, raised portions or pillars 16 can be provided on the pads **14*a* or on the inner portions 22*a* of the connecting elements 22 carried by the plastic sheet 21. From FIG. 12, it can be seen that the centers for the patterns provided on the plastic sheet 21** correspond to the centers of the patterns of the leads are carried by the lead frame.

In forming the assembly, the interconnect patterns or spiders carried by the plastic film 21 may be coated with solder. In addition, the pillars or bumps carried by the pads **14*a* also can be covered or coated with the solder. The dies can then be attached to the interconnect patterns by turning the dies upside down and utilizing ultrasonics as described in Weissenstern et al. Pat. No. 3,255,-511 with or without the use of heat to form true metallurgical bonds between the pads 14*a* and the inner portions 22*a* of the connecting elements 22. Thereafter, after the dies have been attached by ultrasonic bonding, the sheet containing the thin metallic connectig elements carrying the chips 11 are turned upside down and placed face to face with the Kovar lead frame 62. Ultrasonics can again be utilized for making connections or true metallurgical bonds between the outer portions 22*b* of the solder covered interconnect pattern and the inner portions of the leads 61 of the metal frame. At the same time, the die can be secured to the die attach pad 63**.

As soon as this has been accomplished, the entire assembly can be placed in a boat and moved into a furnace to reflow the solder to form good metallurgical connections between the pads 14 on the die 11 and the interconnecting elements 22 and between the interconnecting elements 22 and the leads 61 of the lead frame 62. It can be seen that the steps thus far described are very similar to the steps utilized in connection with the embodiments hereinbefore described.

Figures 12, 13, 14, 15, 16, 17:
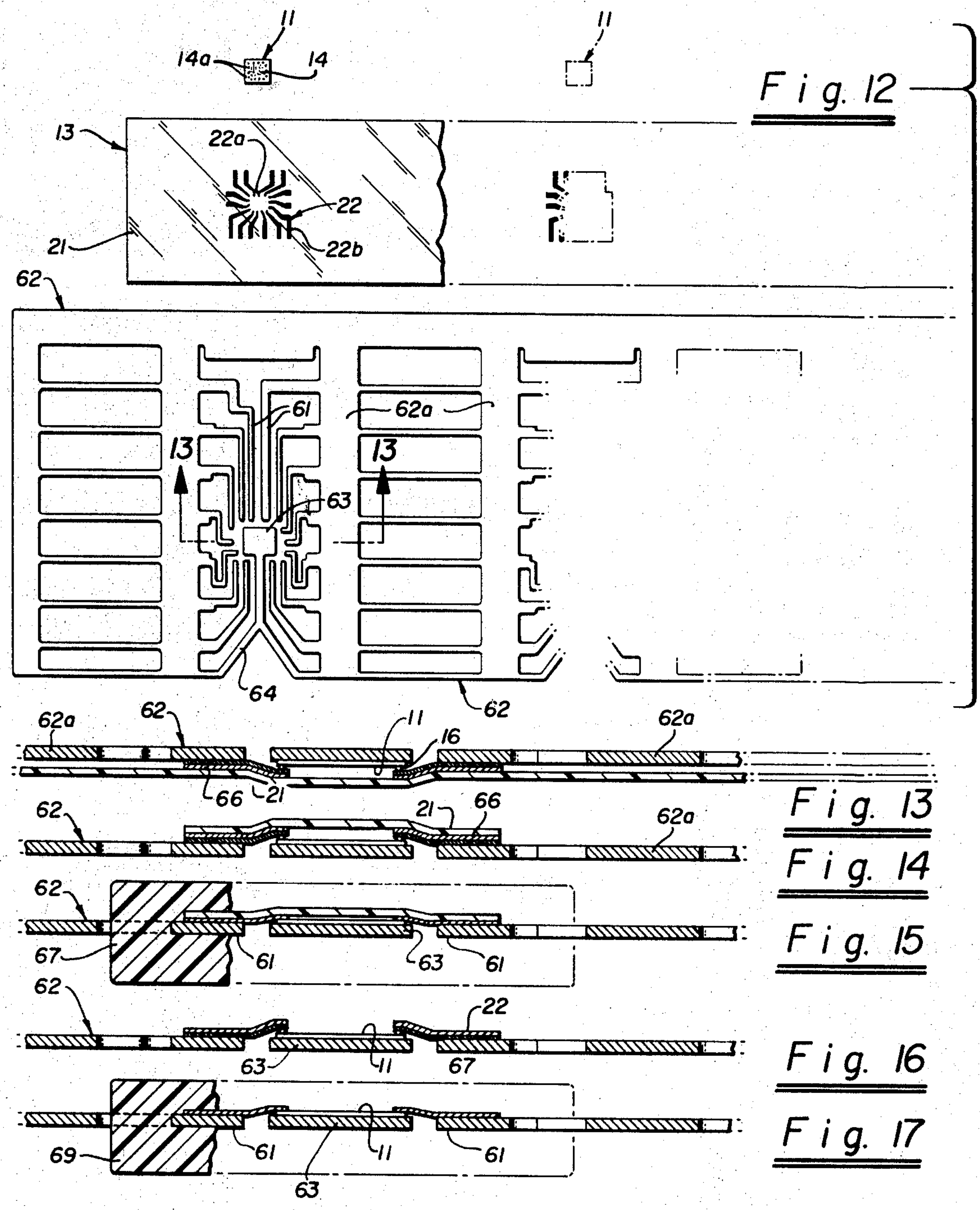
FIG. 12 is a greatly enlarged plan view showing integrated chips or dies, the plastic member varying the interconnect pattern or connecting elements and the metal lead frame.
FIG. 13 is a cross-sectional view looking along the line 13—13 of FIG. 12 with all of the parts shown in FIG. 12 assembled.
FIG. 14 is a cross-sectional view similar to FIG. 13 showing the plastic tab cut away or removed up to the interconnect pattern.
FIG. 15 shows the assembly in FIG. 14 encapsulated within the plastic body.
FIG. 16 is a view similar to FIG. 14 but showing all of the plastic removed and with solder in place.
FIG. 17 is a cross-sectional view showing the assembly encapsulated in a plastic body.

It has been found that it may be very desirable to remove the plastic sheet or film 21 which is utilized for carrying the interconnect pattern. Only a portion of the film can be removed by coating the portions of the plastic film which it is desired to leave in place with a photoresist on the top or back side and thereafter placing the assembly in an etch solution which only attacks the exposed plastic film. Thus, as is shown in FIGS. 2 and 14, only the portions of the film which extend beyond the interconnect elements 22 would be removed. In this way, there is no excess film. Thereafter, the entire assembly can be placed in a furnace to reflow the solder 66 to establish good connection between the die and the interconnect pattern and between the interconnect pattern and the lead.

After this has been completed, the entire assembly can be encapsulated in a plastic body 67 as shown in FIG. 15 to hermetically seal the device.

It has been found that the plastic film is more than adequate to support the interconnecting elements and also to support the diode which is attached to the interconnecting elements. It should be appreciated that the plastic film 21 merely provides a temporary support because as soon as the entire assembly is encapsulated as shown in FIG. 15, it is no longer necessary for the film 21 to serve as a support. Prior to encapsulation, the portions **62*a* can be cut away to provide the leads 61 which will be insulated from each other when encapsulated within the body 67**.

When it is desired to remove all of the plastic film, the entire assembly can be dipped in an etch solution to remove the film. When this is the case, the integrated circuit chip 11 is carried solely by the connecting elements 22 and the solder coating carried thereby. Again, this has been found to be more than sufficient because the thin metallic interconnecting elements have a thickness from approximately .7 to 1.3 mils, and a width of .5 to 5 mils. As soon as this has been accomplished, the assemblies can be placed in a boat and run through a furnace to reflow the solder 66 to form good connectons between the die 11 and the interconnecting elements and between the interconnecting elements 22 and the leads 61. The assembly then can be encapsulated in a plastic body 69 to hermetically seal the circuits carried by the die 11.

In one specific embodiment of the invention, Kapton film was utilized. A commercial solvent called a monoethylamine was utilized for dissovling the plastic sheet or film. Its use is desirable because it did not attack the silicon die 11, the Kovar lead frame or the thin film interconnecting elements formed of aluminum.

It is often preferable to remove the plastic film because in molding the plastic package or body 69 it is desirable that this plastic molding compound surround each of the leads 61 and be in intimate contact with the leads and not be separated from the leads by the Kapton film which would be the case if the Kapton film were left in place.

Figure 18:
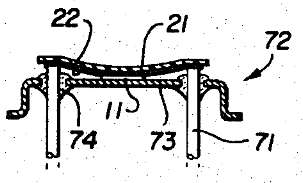
FIG. 18 is a cross-sectional view showing the assembly for use with a TO–100 header.
Figure 19:
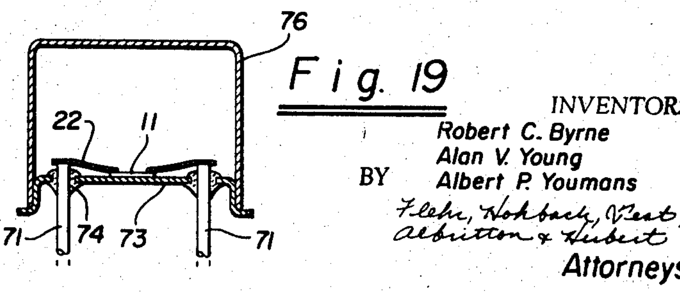
FIG. 19 is the assembly shown in FIG. 18 with the cap in place.

Still another embodiment of the invention is shown in FIGS. 18 and 19 in which a conventional header such as a multipin TO–100 header is utilized in place of the lead frame 62. As can be seen from FIG. 18, the die 11 is attached to the interconnect pattern 22 carried by the plastic film 21. The outer portions of the interconnecting elements 22 are positioned over the upper ends or contact areas of the vertical posts 71 of the TO–100 header 72. As can be seen from FIG. 18, the vertical posts 71 extend through holes provided in the metal member 73 and are insulated therefrom by glass 74. Bonds are then formed between the upper ends of the post 71 and the outer extremities of the interconnect elements 22 by the use of ultrasonics and/or by heating the assembly to reflow the solder to complete the bonds. At the same time, the die 11 can be attached to the metal member 73 of the header 72. Thereafter, the die 11 can be hermetically sealed by placing a cap (not shown) on the header 72.

An alternative arrangement is shown in FIG. 19 in which all of the plastic film has been dissolved away after attachment of the interconnecting elements 22 to the posts 71 so that the circuitry carried by the die 11 is attached to the header 73 and is connected to the upper ends of the posts 71 by the thin film connecting elements 22. A cap 76 is mounted on the header 72 to hermetically seal the die 11.

From the foregoing, it is apparent that we have provided a lead structure for an integrated circuit and assembly thereof which has many advantages. Multiple chips can be placed on a single printed circuit board without any difficulty and only one encapsulation is required. By utilizing multiple chips on a single printed circuit board, a large amount of labor and time is saved over that required for making individual integrated circuit packages. In addition, this makes possible greatly increased packing density for the integrated circuits. By mounting the integrated circuits on tabs, it is possible to measure the electrical parameters of the integrated circuit device accurately. The tab also makes it possible to make a direct connection to the integrated circuit device without additional leads by making a direct bond from the leads to the interconnect areas or pads provided on the integrated circuit die.

In addition to the construction shown in which a rigid tab is utilized, the assembly does not flex during soldering operations and is easy to handle. It can be indexed very easily and is, in general, a very rugged part which can be handled by hand or by machinery.

We claim:

1. In a method for forming an integrated circuit assembly of the type which includes a semiconductor body having at least portions of an electrical circuit formed therein and with contact pads carried by the body and lying in a common plane with the leads carried by the body and connecting the circuits to the pads and a support structure at least a portion of which is formed of insulating material with spaced leads carried by the support structure, the steps comprising forming spaced thin film connecting elements on a plastic film, securing the thin film connecting elements with the plastic film affixed thereto to the pads and to the leads so that the thin film connecting elements establish electrical contact between the circuitry and the leads, and removing only the plastic film after the connecting elements have been secured to the pads and to the leads.

2. In a method for forming an integrated circuit assembly, forming at least portions of an electrical circuit on a semiconductor body with contact pads carried by the body and lying in a common plane and with leads carried by the body and connecting said portion of the integrated circuit to the pads, providing a support structure, at least a portion of which is formed of insulating material, mounting spaced leads upon the support structure so that the leads are insulated from each other and with contact areas lying in a common plane, forming spaced thin film connecting elements with inner and outer portions on a surface of a plastic film so that the thin film connecting elements are insulated from each other, connecting the inner portions of the thin film connecting elements to the pads of the semiconductor body, connecting the outer portions of the thin film connecting elements to the contact areas of the leads so that electrcal contact can be made to said portion of the integrated circuit through the leads, and removing only the plastic film after the connecting elements have been secured to the pads and to the leads.

3. In an assembly of the character described, a semiconductor body having a plurality of diffused junction devices therein interconnected to form at least a portion of an electrical circuit and having contact pads carried by the semiconductor body and connected to said portion of an electrical circuit, said contact pads lying in a common plane exclusively adjacent the outer perimeter of the semiconductor body, support means, at least a portion of said support means being formed of an insulating material, a plurality of spaced metallic leads carried by the support means in such a manner that the metallic leads are insulated from each other by the support means, said leads having contact areas arranged in a pattern exclusively adjacent the outer perimeter of an inner area and lying in a common plane, said leads and said contact pads being spaced apart from each other, a sheet-like member formed of a relatively flexible insulating material having a generally planar surface and a plurality of connecting elements of thin metallic film formed on said sheet-like member, said connecting elements having portions thereof in direct and intimate contact with and bonded to the contact areas and also having portions thereof in direct and intimate contact with and bonded to the contact pads whereby electrical contact can be made through the connecting elements to said portion of the electrical circuit through the leads, said connecting elements being relatively elongate and having a width in the vicinity of the portions in contact with the contact areas which is substantially less than the width in the vicinity of the portions in contact with the contact pads, said metallic leads having their outer ends free of the support means.

4. An assembly as in claim 3 wherein said sheet-like member is formed of a plastic film being capable of withstanding temperatures ranging from 250° C. to 500° C., said sheet-like member being relatively stable dimensionwise under changes in temperature.

5. An assembly as in claim 3 wherein the spacing between the contact pads carried by the semiconductor body is substantially less than the spacing between the contact areas of the metallic leads and wherein the connecting elements have a generally tapered configuration.

References Cited

UNITED STATES PATENTS

| | | | |
|---|---|---|---|
| 3,192,307 | 6/1965 | Lazar | 317—101CPX |
| 3,331,125 | 7/1967 | McCusker | 29—578 |
| 3,390,308 | 6/1968 | Marley | 317—101 CPX |
| 3,405,361 | 10/1968 | Kattner et al. | 324—158 |
| 3,440,027 | 4/1969 | Hugle | 174—68.5 X |

DARRELL L. CLAY, Primary Examiner

U.S. Cl. X.R.

29—193.5, 588, 627; 174—52; 317—101